March 27, 1962

O. S. WANG 3,026,593

CLAMP

Filed March 10, 1958

Inventor
Orville S. Wang
by Howard B. Scheckman
Attorney

United States Patent Office 3,026,593
Patented Mar. 27, 1962

3,026,593
CLAMP
Orville S. Wang, La Crosse, Wis., assignor to Allis-Chalmers Manufacturing Company, Milwaukee, Wis.
Filed Mar. 10, 1958, Ser. No. 720,438
3 Claims. (Cl. 24—249)

This invention relates generally to agricultural implements and more particularly to improved means for releasably clamping a tool gang to a support bar of a tractor.

My improved clamping means is of the type having one fixed jaw and an opposed pivotally mounted movable jaw. Clamping means of the pivoted jaw type are known. See for example, U.S. Patent 2,490,237, to W. H. Silver wherein a pivoted jaw is used to clamp a tool to a support bar of a tractor.

Clamps of this type have not been completely satisfactory however. Due to surface irregularities in the support bar, variation in the size of the support bar because of manufacturing tolerances, and the difficulty of accurately locating the movable jaw, the clamp cannot equally engage all four surfaces of the support bar and as a result shifts its position on clamping. When the clamp shifts position, it swings the tools of the tool gang in an arc. As a result the tools on adjacent gangs do not have the same draft. This is undesirable in many earth working operations, as for example, cultivating. In addition the shifting provides uneven forces on the parts of the clamp causing freezing of the parts making the clamp difficult to open.

It is an object of my invention to provide a clamp that is less likely to shift position than previous clamps.

It is another object of my invention to provide a clamp that can be easily opened.

Other objects and advantages will appear from the following description considered in conjunction with the attached drawings, in which.

Figure 1:
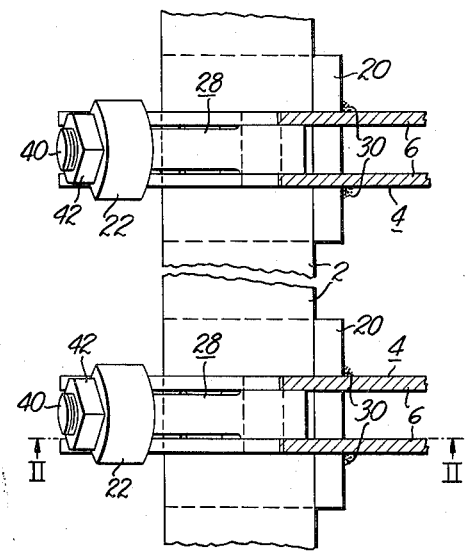
FIG. 1 is a plan view of a support bar showing several calmps connected thereto.

Referring to FIG. 1 there is disclosed a square support bar 2 carried by a tractor (not shown). The support bar in turn supports tool gangs 4.

Figure 2:
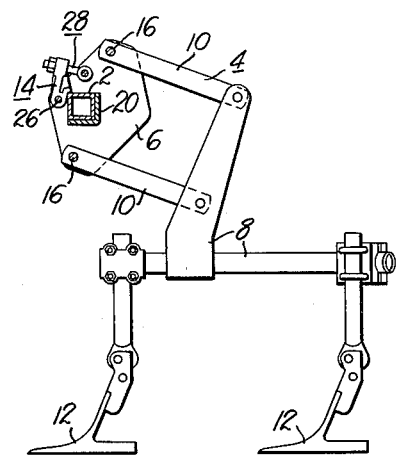
FIG. 2 is a sectional view of FIG. 1 taken in the direction of arrows II—II showing the tool gang and the connection of the clamp to the support bar.

Each tool gang 4 (FIG. 2) comprises a hanger 6, a standard 8, parallel links 10, 10 interconnecting hanger 6 and standard 8, ground engaging tools 12 carried by said standard, and clamping means 14 releasably connecting hanger 6 to support bar 2. This specific type of tool gang arrangement is more fully disclosed in copending application S.N. 718,515, of W. H. Tanke.

Hanger 6 to which the parallel links 10, 10 are connected comprises two spaced parallel plates (FIG. 1), interconnected by bolts 16. A square opening 18 (FIG. 3) is provided in plates 6, 6 to receive square support bar 2.

My new clamping means 14 (FIG. 3) comprises a three surface clamping arrangement. The arrangement includes a fixed jaw or saddle member 20 of V-shape, carried in square opening 18 in hanger 6; a movable arm jaw 22 which engages the corner 24 of support bar 2; means 26 pivotally mounting arm jaw 22 on hanger 6 in opposing relation to saddle 20; and, force means 28 to move jaw 22 relative to jaw 20.

The saddle member 20 is welded as at 30 (FIG. 1) to hanger plates 6, 6 to maintain them laterally stable and also to align hanger 6 against support bar 2.

Figure 3:
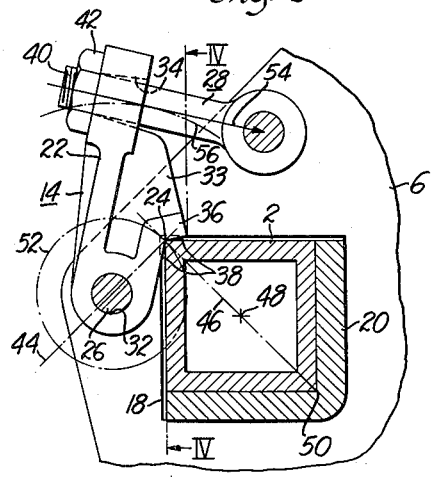
FIG. 3 is an enlarged view of FIG. 2 disclosing the clamp and support bar in greater detail.
Figure 4:
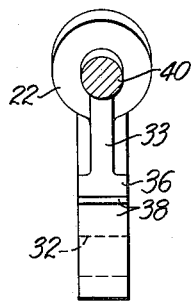
FIG. 4 is a sectional view taken in the direction of line IV—IV of FIG. 3 showing a side view of the arm.

Arm jaw 22 is an elongated member having, an opening 32 at one end cooperating with pivot means 26; a funnel shaped opening 34 at the other end, at right angles to first opening 32, cooperating with force means 28; a reinforcing rib 33; and, an intermediate abutment portion 36 that is shaped to have only line contact with said support bar (which is seen as a point in the cross section of support bar 2 shown in FIG. 3), said intermediate portion being illustrated as a bight portion whose sides 38 form an obtuse angle.

Means 26 pivotally mounting said arm jaw on said hanger comprises a pivot. Pivot 26 extends through opening 32 in arm jaw 22 and is rotatably supported by said spaced hanger plates 6, 6.

The force means 28 which moves said arm jaw relative to said saddle 20 comprises an eye bolt 40 and nut 42. The eye bolt has one end pivotally supported by said spaced plates of hanger 6, 6 and its other end threaded through funnel shaped opening 34 provided in arm jaw 22. Nut 42 is threaded on the end of the eye bolt and engages arm jaw 22 to move said arm jaw to clamp support bar 2.

Referring to FIG. 3 it will be seen that the single force the arm jaw applies, does not tend to shift the clamp relative to support bar 2. Pivot means 26 (FIG. 3) which supports arm jaw 22 is positioned with respect to saddle 20, along a line 44. Line 44 passes through the corner edge 24 of support bar 2 and also is perpendicular to a second line 46. Line 46 passes through axis 48 of said support bar and apex 50 of said V-shaped saddle. Pivot means 26 is located so arm jaw 22 will be positioned to engage support bar 2 and apply its clamping force along second line 46. This force will be tangent to arc 52 in which arm jaw 22 moves, and is directed toward axis 48 of support bar 2 and apex 50 of said V-shaped saddle. Since the force applied by said arm jaw is directed toward the axis of said support bar, there will be no moments created that will tend to shift said clamp relative to said support bar. Further the clamp will now center itself with respect to the corner of the support bar, rather than shift its position relative to the support bar.

To facilitate easy opening of the clamp, force means 28 is positioned so that force 54 applied by said force means will not have a large force component jamming arm jaw 22 against pivot 26. Force means 28 exerts a force 54 that is substantially tangent to arc 56 that said arm jaw moves in when abutment portion 36 is in contact with support bar 2. This is so there will be little or no force trying to jam said arm jaw against pivot 26 which can cause arm jaw 22 to bind. As a result arm jaw 22 can be easily released from its clamping engagement with said support bar.

One particular advantage of my clamp is that it will not shift position when the size of said support bar varies because of tolerances used in manufacturing the support bar. This is because the path of movement of said abutment portion 36 (FIG. 3) is an arc 52 which for a limited distance of travel does not vary too much from line 46 which is at a 45 degree angle. Although the dimensions of the support bar vary, its corner 24 still substantially moves along this 45 degree line. Abutment portion 36 will therefore continue to engage corner 24 of support bar 2 even though the size of support bar 2 varies.

From examining FIG. 3 it can be seen that the clamp can be designed so abutment portion 36 moves in a flatter arc which would more closely follow line 46. All that would be necessary is that pivot 26 of arm jaw 22 be moved a greater distance from the point abutment portion 36 engages support bar 2. However locating pivot 26 closer to abutment portion 36, as is illustrated in FIG. 3, permits a smaller hanger to be used, and even more important, provides a better mechanical advantage so a smaller force means 28 can be used.

Operation

Referring to FIGS. 1 and 3, and assuming that nuts 42 are not tightened, hangers 6 are normally moved along support bar 2 until in a desired position. Once hangers 6 have been positioned in their adjusted position, nuts 42 are tightened. This moves the bight portion of arm jaw 22 against corner 24 of support bar 2 forcing saddle 20 against the two sides of support bar 2 to align hangers 6 against support bar 2 and lock said hangers in place.

Summary

I have provided a clamp that is less likely to shift position than previous clamps because my clamp: (1) abuts only two surfaces of the support bar and makes only line contact with the third surface, rather than all four surfaces, so that the clamp is less affected by surface irregularities; (2) directs its clamping force toward the axis of the support bar and the apex of the saddle so that there are no movements created that tend to twist the clamp relative to the support bar; and finally, (3) is not affected by variations in the size of the support bar, since the abutment portion moves in an arc that closely follows the path the corners of the support bars will move along.

I have also provided a clamp having a force means 28 that applies its force substantially tangent to the path of movement (arc 56) of said arm jaw when the abutment portion is in clamping position. Since there is little or no force jamming said arm jaw against the pivot means 26 there is little tendency of the clamp to shift position and put unequal strain on the parts of the clamp. There will therefore be no tendency for the arm jaw to bind and it will be easy to open the clamp.

Although the support bar is illustrated as square it is obvious that my clamp will work on round workpieces and workpieces of different shapes.

Although but a single embodiment of the present invention has been illustrated and described, it will be apparent to one skilled in the art that various changes and modifications may be made therein without departing from the invention as defined in the appended claims.

What is claimed is:

1. In an agricultural implement, a clamp for clamping a hanger to a support bar of polygonal cross section having at least a pair of diametrically disposed corners, comprising: a hanger; a V-shaped saddle for receiving one of said corners of said support bar, said V-shaped saddle being fixed to said hanger; an arm jaw; an abutment portion provided on said arm jaw; means pivotally mounting said arm jaw on said hanger in opposing relation to said saddle; said abutment portion including sides forming a V-shaped recess whose apex is parallel to the longitudinal axis of said support bar and describes an arc tangential to a line that bisects the angle of said V-shaped saddle; and, force means pivotally connected to said hanger and cooperating with said arm jaw for moving said apex thereof to a position substantially at the point of tangency between said arc and said line for contacting said other corner of said support bar.

2. In an agircultural implement, a clamp for clamping a hanger to a square support bar, comprising: a hanger; V-shaped saddle that receives said support bar, said V-shaped saddle being fixed to said hanger; an arm jaw; an abutment portion provided on said arm jaw; means pivotally mounting one end of said arm jaw on said hanger in opposing relation to said saddle; said abutment portion of said arm jaw having sides forming an obtuse angle with an apex positioned to have line contact with a corner of said square support bar along a line that is parallel to the longiutdinal axis of said support bar, said apex describing an arc tangential to a line that bisects the angle of said V-shaped saddle; and, force means pivotally connected to said hanger and engaging the other end of said arm jaw for moving said abutment relative to said V-shaped saddle to clamp said support bar against said V-shaped saddle.

3. In an agricultural implement, a clamp for clamping a hanger to a square support bar, comprising: a hanger; a V-shaped saddle that receives said support bar, said V-shaped saddle being fixed to said hanger; an arm jaw; an abutment portion provided on said arm jaw; means pivotally mounting one end of said arm jaw on said hanger in opposing relation to said saddle; said abutment portion presenting a recess with an apex positioned to move in an arc that is tangent to a line that bisects the angle of said V-shaped saddle, said apex of said abutment portion being substantially at the tangential portion of said arc when it contacts said support bar; and, force means pivotally connected to said hanger and cooperating with the other end of said arm jaw for moving said abutment relative to said V-shaped saddle to clamp said support bar between said apex of said abutment portion and said V-shaped saddle.

References Cited in the file of this patent
UNITED STATES PATENTS

| | | |
|---|---|---|
| 2,361,362 | Altgelt | Oct. 31, 1944 |
| 2,490,237 | Silver | Dec. 6, 1949 |
| 2,607,278 | Hill | Aug. 19, 1952 |
| 2,619,313 | Whittington | Nov. 25, 1952 |
| 2,824,381 | Traupmann | Feb. 25, 1958 |